(12) United States Patent
Matsuo

(10) Patent No.: US 10,908,852 B2
(45) Date of Patent: Feb. 2, 2021

(54) IMAGE PROCESSING APPARATUS RECEIVING, GENERATING, PROCESSING, AND OUTPUTTING PRINT DATA

(71) Applicant: BROTHER KOGYO KABUSHIKI KAISHA, Nagoya (JP)

(72) Inventor: Yu Matsuo, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 203 days.

(21) Appl. No.: 16/249,277

(22) Filed: Jan. 16, 2019

(65) Prior Publication Data

US 2019/0220233 A1 Jul. 18, 2019

(30) Foreign Application Priority Data

Jan. 16, 2018 (JP) ................. 2018-004617

(51) Int. Cl.
*G06F 3/12* (2006.01)
(52) U.S. Cl.
CPC .......... *G06F 3/1212* (2013.01); *G06F 3/1211* (2013.01); *G06F 3/1243* (2013.01); *G06F 3/1244* (2013.01); *G06F 3/1253* (2013.01); *G06F 3/1285* (2013.01)
(58) Field of Classification Search
CPC .... G06F 3/1212; G06F 3/1244; G06F 3/1211; G06F 3/1253; G06F 3/1243; G06F 3/1285
See application file for complete search history.

(56) References Cited

U.S. PATENT DOCUMENTS

2019/0212689 A1 * 7/2019 Matsui ............... G03G 15/6564

FOREIGN PATENT DOCUMENTS

| JP | 2014071584 A | 4/2014 |
|---|---|---|
| JP | 2017151743 A | 8/2017 |

* cited by examiner

*Primary Examiner* — Eric A. Rust
(74) *Attorney, Agent, or Firm* — Scully, Scott, Murphy & Presser, PC

(57) ABSTRACT

A non-transitory computer-readable recording medium for information processing device contains instructions configuring a first module and a second module. The first module causes the controller to receive a print instruction, instruct the controller executing the second module to generate a print job in response to print instruction and generation of a plurality of job pages, generate page print data for each page, and deliver data indicating the page print data to the controller executing the second module for each of the job pages. The second module causes the controller to generate the print job in response to the instruction, generate a plurality of job pages for the print job, obtain the page print data for each of the job pages, and output first instruction data including the page print data and a printing command when the page print data is obtained for each of the job pages.

11 Claims, 5 Drawing Sheets

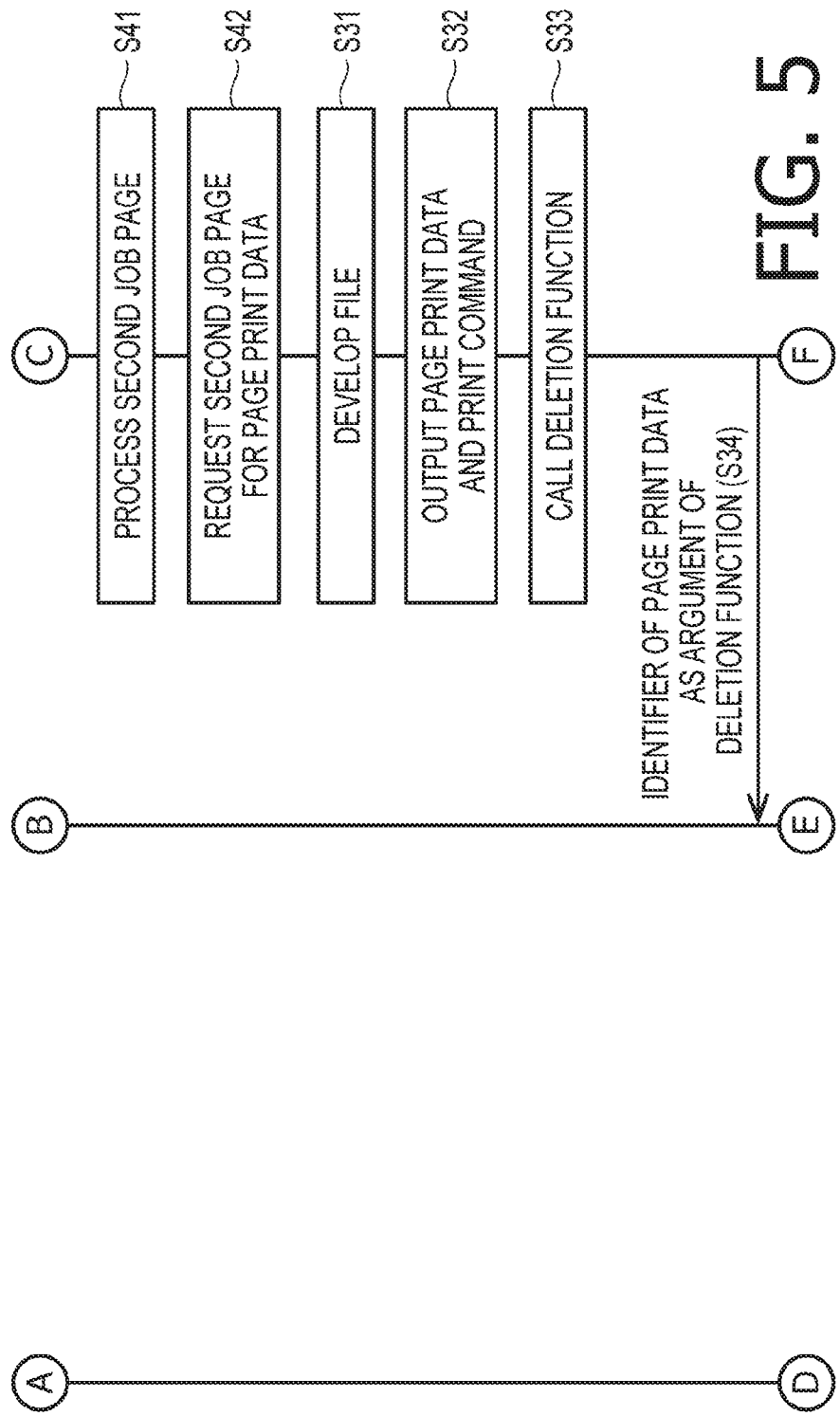

IMAGE PROCESSING APPARATUS RECEIVING, GENERATING, PROCESSING, AND OUTPUTTING PRINT DATA

CROSS-REFERENCE TO RELATED APPLICATIONS

This application claims priority under 35 U.S.C. § 119 from Japanese Patent Application No. 2018-004617 filed on Jan. 16, 2018. The entire subject matter of the application is incorporated herein by reference.

BACKGROUND

Technical Field

The present disclosures relate to a non-transitory computer-readable recording medium containing instructions for an image processing device which can be communicatably connected to a printer.

Related Art

There has been known application software including a print data generating program causing a processor of an information processing device to generate print data, and an SDK (Software Development Kit) causing the processor to receive the generated print data and transmit the received print data to a printer.

SUMMARY

According to such a conventional technique, it is not sufficiently clear as to how the page-basis print data is processed in the application as mentioned above.

According to aspects of the present disclosures, there is provided a non-transitory computer-readable recording medium for information processing device provided with a network interface, a user interface and a controller, the recording medium containing instructions configuring a first module and instructions configuring a second module. The first module causes, when executed, the controller to perform a first receiving process of receiving a print instruction through the user interface, a first instructing process of instructing the controller executing the second module to generate a print job in response to receipt of the print instruction in the first receiving process, a second instructing process of instructing generation of a plurality of job pages to the print job generated by the controller executing the second module in the first instructing process, a generating process of generating page print data which is print data for each page based on the image data instructed by the print instruction, and a first delivering process of delivering data indicating the page print data generated in the generating process to the controller executing the second module for each of the job pages. The second module causes, when executed, the controller to perform a first generating process of generating the print job in response to the instruction issued in the first instructing process, a second generating process of generating a plurality of job pages for the print job in response to the instruction made in the second instruction process, a first obtaining process of obtaining the page print data delivered from the first delivering process for each of the job pages generated in the second generating process, and a first outputting process of outputting first instruction data including the page print data obtained in the first obtaining process and a printing command causing the printer to perform printing when the page print data is obtained for each of the job pages.

According to aspects of the present disclosures, there is provided a non-transitory computer-readable recording medium for an information processing device provided with a network interface, a user interface and a controller. The recording medium contains instructions configuring a communication module which causes, when executed, the controller to perform a first generating process of generating a print job in accordance with an instruction received from the controller executing a UI module, a second generating process of generating a plurality of job pages in accordance with the instruction received from the controller executing the UI module, an obtaining process of obtaining the page print data indicated by data which is delivered from the controller executing the UI module for each of the job pages generated in the second generating process, and an outputting process of outputting instruction data including the page print data obtained in the obtaining process and a printing command causing the printer to perform printing every time when the page print data is obtained for each of the job pages.

BRIEF DESCRIPTION OF THE ACCOMPANYING DRAWINGS

FIG. 5 shows flowcharts which replace a part (i.e., FIG. 3) of the flowcharts shown in FIGS. 2-4 according to a modification of the illustrative embodiment.

DETAILED DESCRIPTION OF THE EMBODIMENT

Hereinafter, referring to the accompanying drawings, an illustrative embodiment of the present disclosures will be described. It should be noted that the embodiment and modification described hereinafter are only examples of aspects of the present disclosures, and can be further modified without departing from the aspects of the present disclosure. For example, the order of steps of processes described later may be changed without departing from the aspects of the present disclosures.

Illustrative Embodiment

Figure 1:
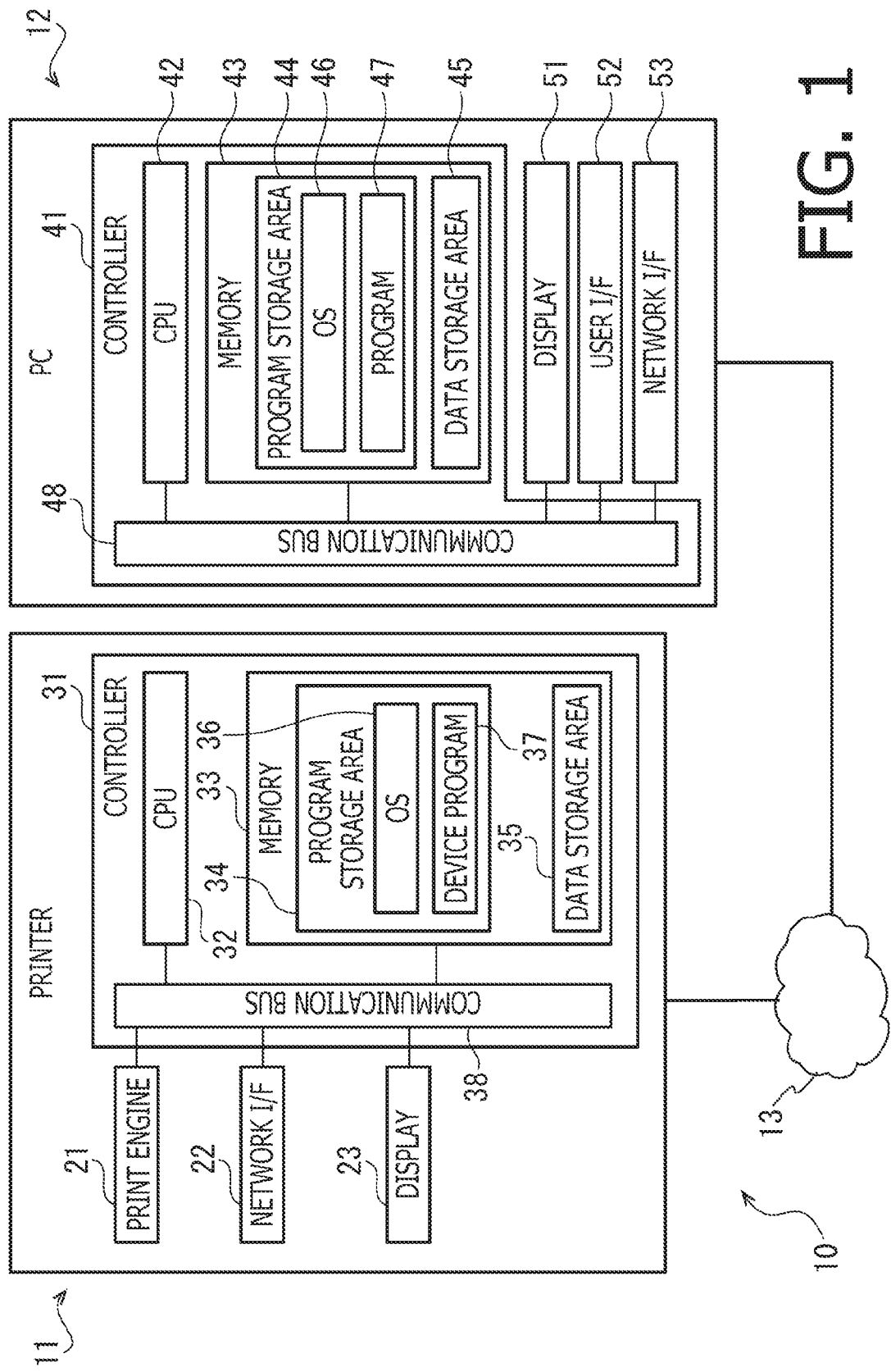
FIG. 1 is a block diagram schematically showing a configuration of a printing system according to an illustrative embodiment of the aspects of the present disclosures.

A printing system 10 according to an illustrative embodiment of the present disclosures include, as shown in FIG. 1, a printer 11 and a PC 12, which are connected to a communication network 13 and mutually communicatable with each other through the communication network 13. The PC 12 is an example of an information processing device. It is noted that the information processing device may be a personal computer, a mobile terminal such as a smartphone or a tablet. In the following description, a case where the PC 12 is a personal computer will be explained.

The communication network 13 may be a wireless LAN, a wired LAN, a WAN or a combination of a part of or all of them. The printer 11 and the PC 12 may be connected through a USB cable or the like instead of the communication network 13. The configuration shown in FIG. 1 may be modified such that plurality of printers 11 are connected to the communication network 13.

The printer 11 is a so-called label printer. The printer 11 is configured to perform a printing operation on a printing medium and cutting out a printed portion of the printing medium. Examples of the printing medium are a tape made of a laminated film, a label sheet, a rolled sheet or the like. In the following description, a case where the tape is used as the printing medium will be described.

The printer 11 includes a print engine 21, a network I/F 22, a display 23 and a controller 31. Each of the print engine 21, the network I/F and the display 23 is connected to a communication bus 38 of the controller 31 so as to be mutually communicatable with the controller 31.

The print engine 21 includes a conveyor configured to convey the tape, a printing device configured to perform printing on the tape conveyed by the conveyor, and a cutting device configured to cut out the tape.

The conveyor has, for example, a conveying roller which is driven by a motor to rotate. Rotation of the motor is controlled by the controller 31. Accordingly, the controller 31 controls the rotation of the motor to control a conveying timing and a conveying amount of the tape.

The printing device has, for example, a thermal head provided with a plurality of heating elements. As the controller 31 selectively controls the plurality of heating elements to generate heat, the printing device performs printing on the tape made of heat sensitive material.

The cutting device has, for example, a cutter which is driven by a solenoid. The controller 31 outputs a control signal to drive the cutter to cut the tape.

It is noted that, in FIG. 1, the motor, the heating elements, the solenoid and a driving circuit are omitted for brevity since they are conventionally known.

The printer 11 is connected to the communication network 13 through the network I/F 22. That is, the controller 31 transmits/receives information through the network I/F 22. There is no limitation regarding a communication method to be used for the network I/F 22, and a USB I/F to/from which a USB cable is attachable/detachable can be employed as the network I/F 22. Alternatively, a Wi-Fi® I/F may be employed as the network I/F 22.

The display 23 may be a liquid crystal display, an organic EL display or the like, and have a display screen configured to display various pieces of information.

The controller 31 has a CPU 32, a memory 33 and the communication bus 38. The CPU 32 and the memory 33 are connected to the communication bus 38. The communication bus 38 is connected to the driving circuit of the print engine 21, the network I/F 22 and the display 23. The CPU 32 is connected, through the communication bus 38, to the print engine 21, the network I/F 22 and the display 23.

The memory 33 has a program storage area 34 and a data storage area 35. The program storage area 34 stores programs such as an OS 36 and a device program 37. The data storage area 35 stores data necessary for executing the program(s).

The OS 36 is a basic program of the printer 11. The device program 37 transmits a control program to the print engine 21 to control an operation of the print engine 21, transmits an image signal to the display 23 to make the display 23 display an image, and controls communication, through the network I/F 22, with an external device such as PC, in association with the OS 36. It is noted that the device program 37 may be a single program or aggregation of a plurality of programs.

The program storage area 34 is, for example, an area in a ROM. The data storage area 35 may be an area in the ROM, an EEPROM, an HDD, a portable storage device (i.e., a USB memory) which is detachably attached to the printer 11, a buffer provided to the CPU 32 and the like.

The memory 33 may be a computer-readable storage medium. The computer-readable storage medium is a non-transitory medium. The non-transitory medium includes, in addition to the above, a recording medium such as a CD-ROM and a DVD-ROM. Further, the non-transitory medium is also a tangible medium. It is noted that an electric signal which carries a program downloaded from a server on the Internet is a computer-readable signal medium which is one kind of the computer-readable media but not regarded as the non-transitory computer-readable medium. A memory 43 of the PC 12 (described later) is also regarded as the non-transitory computer-readable medium.

The PC 12 includes a controller 41, a display 51, a user I/F 52, a network I/F 53 and a communication bus 48.

The display 51, the user I/F 52 and the network I/F 53 are connected to the communication bus 48 of the controller 41. Configurations of the display 51, the network I/F 53 and the communication bus 48 are substantially the same as the configurations of the display 23, the network I/F 22 and the communication bus 38 of the printer 11, respectively.

The user I/F 52 includes a keyboard and a mouse. The user I/F 52 is used to input operation signals to the controller 41 in accordance with user's operations. The operation signals are input to the controller 41 through the communication bus 48.

The controller 41 includes a CPU 42, the memory 43 and the communication bus 48. The CPU 42 is an example of a computer.

The memory 43 has a program storage area 44 and data storage are 45. The program storage area 44 stores programs including an OS 46 and a program 47. The data storage area 45 stores data necessary to execute programs.

The OS 46 is a basic program of the PC 12. The OS 46 is an operating system such as Mac OS®, Windows®, Linux®, Android® OS or the like. The OS 46 is configured to cause the CPU 42 to execute, in parallel, multiple programs installed in the PC 12. The multiple programs are executed virtually in parallel with adopting a time division multiplex system.

It is noted that the OS 46 is provided with a print module. For example, when the OS 46 is the Mac OS®, the OS 46 is provided with AirPrint® module as the print module.

The program 47 causes the PC 12 to generate print data, deliver the generated print data to the print module of the OS 46, and transmit the print data to the printer 11 through the network I/F 53. The program 47 includes a UI module 61, an image generation module 62 and a printer communication module 63 (see FIG. 2). The UI module 61, the image generation module 62 and the printer communication module 63 are executed virtually in parallel by the OS 46. It is noted that the program 47 may directly transmit the generated print data to the printer 11 through the network I/F 53, without using the OS 46.

The UI module 61 is a program functioning to display an input screen on the display 51, receive user's input of instruction using the user I/F, input a print data generation instruction to the image generation module 62, and input print job generation instruction to the printer communication module 63. The UI module 61 is an example of a third module.

The image generation module 62 is a program functioning to generate page print data in accordance with the instruction transmitted from the UI module 61. The image generation module 62 is an example of a fourth module. The UI module 61 and the image generation module 62 are examples of a first module.

The printer communication module 63 is a program functioning to generate and output, in accordance with the instruction input from the UI module 61, print instruction data to be input to the printer 11. The print instruction data includes an initialization command, a print command, the page print data and a completion command. The printer communication module 63 is an example of a second module and the communication module. The print instruction data is an example of a first instruction data and an instruction data.

The initialization command is for causing the printer 11 to execute an initialization process. The initialization process is a process the printer 11 executes before executing a printing operation on the tape. For example, in the initialization process, the printer 11 transmits a control signal to the print engine 21 so that the tape is conveyed by a particular length and the cutter cuts out an end portion of the tape. By executing such an initialization process, a distance from the end of the tape to a print start position is always kept constant. It is noted that the initialization process may include, in addition to the above process, a process of actuating a driving circuit for a switching regulator of the print engine 21. The initialization command is an example of an initializing command and second instruction data.

The print command is for instructing the printer 11 to print an image represented by the page print data on the tape. The print command is an example of a printing command.

The completion command is for instructing the printer 11 to stop cutting the tape with use of the cutter, to de-actuating the driving circuit of the switching regulator and the like. The completion command is an example of a termination command.

As a process of generating the print instruction data, the printer communication module 63 generates a print job in accordance with a print job generation instruction input through the UI module 61. Further, the printer communication module 63 generates a job page in accordance with a job page generation instruction input through the UI module 61. The printer communication module 63 has a job class for generating the print job, and a job page class for generating the job page. The "class" serves as a blueprint of an object in class-based object-orientation, and could be said as one of abstract data types. An example of the class is a "class" defined in the C++ language. The print job and the job page are instances generated from the "class." That is, the printer communication module 63 has a function of generating an instance of the print job and a function of generating an instance of the job page. It is noted that the "instance" is also referred to as an "object."

The page class is a polymorphically defined class. Therefore, it is possible to generate an instance of a first class job page and an instance of a second class job page from the page class. The instance of the first class job page is an instance of calling an image generation function in response to a request for output of the page print data, obtain the page print data generated by the image generation function as a return value of the image generation function, and outputting the obtained print data (hereinafter, the first class job page will also be referred to as a first job page). The instance of the second class job page is an instance of outputting the page print data having been stored in advance in response to a request for output of the page print data (hereinafter, the second class job page will also be referred to as the second job page).

The printer communication module 63 generates a job page in response to receipt of a job page generation instruction from the UI module 61. The job page generation instruction includes an argument indicating whether the first job page or second job page is to be generated. The printer communication module 63 generates a job page in accordance with the argument of the job page generation instruction, and registers the generated job page with the generated print job.

The first job page is generated when the image data which is designated to be printed by the user is to be converted to the page print data with the image generation module 62 (described later). The second job page is generated when the page print data generated from the image data which is designated to be printed by the user has already been stored in the memory 43 when the print instruction is made. That is, when the image data designated to be printed by the user is to be converted to the page print data with the image generation module 62, the first job page is generated. Further, when the page print data generated from the image data which is designated to be printed by the user has already been stored in the memory 43 when the print instruction is made, the second job page is generated.

In response to receipt of the job start instruction from the UI module 61, the printer communication module 63 registers the first job page and/or the second job page as generated with the print job.

As described above, the printer communication module 63 is configured to register, in accordance with the job page generation instruction input from the UI module 61, two kinds of job pages, which are the first job page for calling the image generation function in response to a request for output of the page print data and the second job page for outputting the page print data in response to request for output of the page print data, with the print job.

The UI module 61 is configured to generate and output the job page generation instruction instructing generation of the first job page or the second job page depending on whether the page print data, which is generated based on the image data designated to be printed by the user has been stored in the memory 43 at the time of the print instruction is made.

Figure 3:
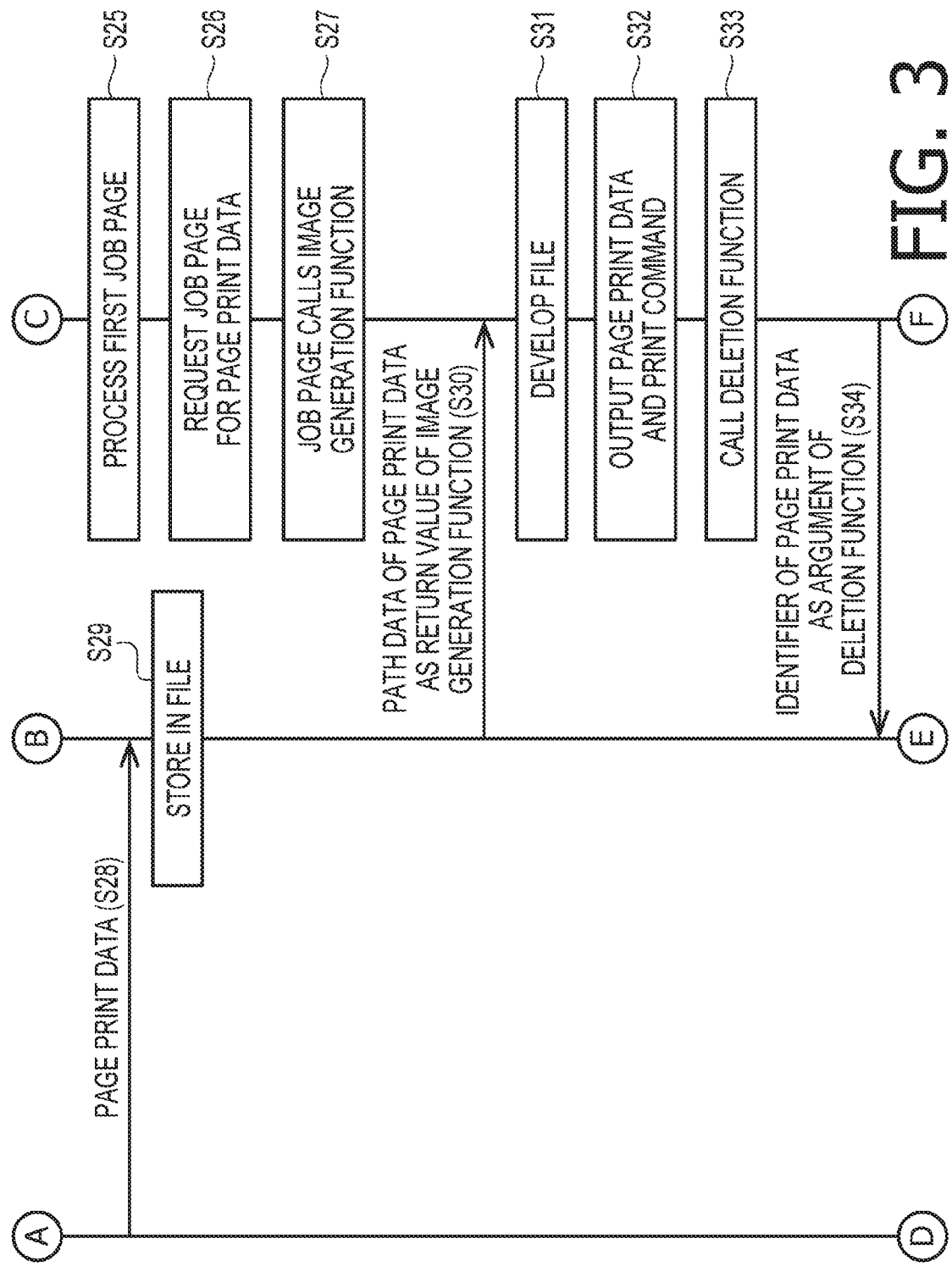
Figure 4:
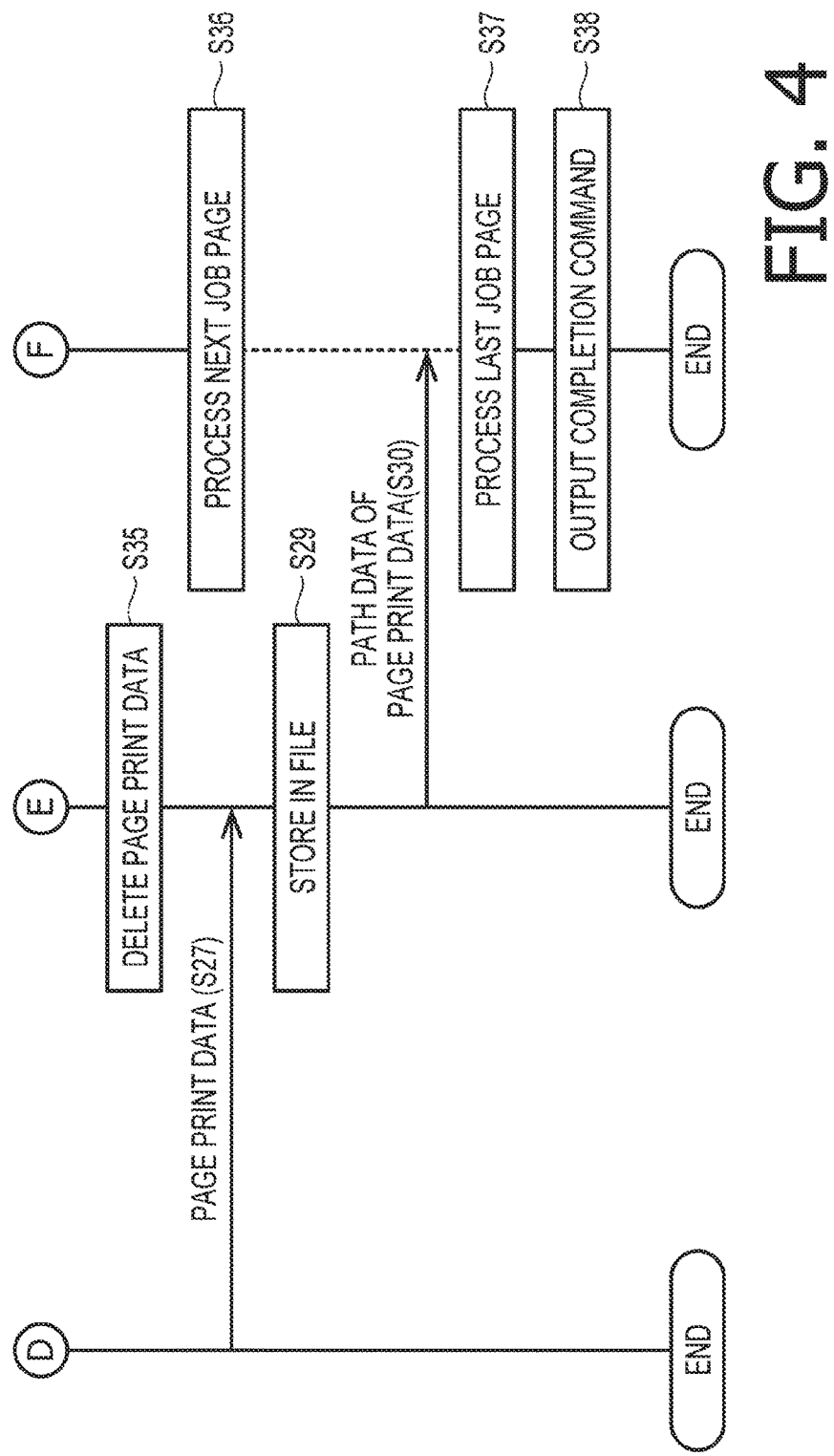

Hereinafter, referring to FIGS. 2-4, processes executed by the program 47 (i.e., the UI module 61, the image generation module 62 and the printer communication module 63) when the user inputs the print instruction will be described.

According to the illustrative embodiment, a process the program 47 executes when the page print data, which is generated based on the image data designated by the user, has not been stored in the memory 43 when the print instruction is made will be described. A process executed by the program 47 when the page print data, which is generated based on the image data designated by the user, has been stored in the memory 43 when the print instruction is made will be described later as a modified embodiment.

It is noted that, in the following description, processes of the CPU 12 in accordance with instructions scripted in programs are basically indicated. Processes indicated by terms "determine", "extract", "select", "calculate", "judge", "identify", "obtain", "receive", "control", and "set" are the processes of the CPU. It is noted that the processes executed by the CPU include a hardware control through a controller such as the OS. It is further noted that the term "obtain" will be used to mean a concept in which a request is not necessary. That is, a process in which the CPU receive data without requesting for the same is included in a concept that the CPU obtains the data. Further, a term "data" in the specification is represented by a computer-readable bit array. A plurality of pieces of data having substantially the same meaning/contents but different formats will be treated as the same data. A term "information" used in the specification will be treated in the same manner. Further, the processes of "instruct", "respond" and "request" are executed by communicating information/data indicating "instruct", "respond" and "request", respectively. Alternatively, the terms "instruct", "respond" and "request" may be used to mean the information indicating the "instruct", "respond" and "request", respectively.

Further, a process executed by the CPU in accordance with instructions described in a program will occasionally be described such that "the CPU 42 executes", "the program 47 executes", "the controller 41 executes" or "the PC 12 executes". So are the processes executed by the CPU 31.

Further, a process of determining, by the CPU, whether information A indicates a fact B may be conceptually described such that "the CPU determines whether a fact is the fact B based on the information A". Similarly, a process of determining, by the CPU, whether the information indicate the fact B or a fact C may be described such that "the CPU determines whether a fact is the fact A or the fact B based on the information A".

It should be noted that the "data" and the "information" used in the specification are common in regard to a point that both are bit(s) or a bit string which can be handled by a computer. In the specification, the computer is capable of handling the "data" regardless of the meaning of the bit or bit string. In contrast, the computer handles the "information" such that operations of the computer vary depending on the meaning of respective bit or bit string. Further, an "instruction" represents a control signal causing a destination device, to which the instruction is transmitted, to execute a succeeding operation. The "instruction" may include the "information" or the "instruction" itself may have a property as the information.

It should also be noted that multiple pieces of data or information respectively used in different computers are regarded as the same data or information as far as only difference among the multiple pieces of data/information is a type (e.g., whether the data/information is of a text type, a binary type, a flag type or the like) but the meanings represented by the multiple pieces of data/information are the same. For example information representing there are "two" items may be stored as text type information, "0x32" (ASCII code) on one computer, and in another computer, the same information may be stored as binary format information, "10" (binary notation).

It should further be noted that "data" and "information" should not be distinguished strictly from each other. Rather, "data" and "information" may be treated in an exceptional manner. For example, "data" may be treated as "information" temporarily, or "information" may be treated as "data" temporarily. Further, what is treated as "data" in a certain apparatus may be treated as "information" in another apparatus. Furthermore, "information" may be extracted from "data," and vice versa.

Throughout the specification, an expression "in accordance with" is used to describe a case where a condition described before the expression (i.e., "in accordance with") is fulfilled, a process described after the expression is performed. It is noted that a timing when the process is performed is merely after the condition is fulfilled and need not be "immediately after" fulfillment of the condition.

The UI module 61 of the program 47 is started in response to input of the user instruction through the user I/F 52 (S11), or in response to the instruction by the OS 46 (S11). For example, when the print instruction is input during execution of a word processing program (not shown), the OS 46 starts the UI module 61.

When started up, the UI module 61 displays the input screen on the display 51 (S12), and receives the user input of the print instruction (S13). The process in S13 where the UI module 61 receives the print instruction is an example of a receiving process. A process in S12 where the UI module 61 displays the input screen on the display 51 is an example of a displaying process.

When input of the print instruction is received (S13), the UI module 61 inputs the print job generation instruction to the printer communication module 63 (S14). The print job generation instruction is a command instructing the printer communication module 63 to generate the print job. The process of S14 where the UI module 61 transmits the print job generation instruction to the printer communication module 63 is an example of a first instructing process.

When input of the print instruction is received (S13), the UI module 61 inputs the print data generation instruction to the image generation module 62 (S15). The print data generation instruction is a command instructing the image generation module 6 to generate one or more pages of page print data based on the image data subjected to be printed.

The image data may be image data of a character string the user inputs using the UI module 61, or image data of a stamp or a character string the user designated with use of the UI module 61. Further, the image data may be one drawn with use of a function of the UI module 61. Furthermore, the image data may be image data, which is generated, in accordance with an instruction issued by the UI module 61, by the image generation module 62. Still further, the image data may be one indicating image data indicative of a document generated by a word processing program (not shown), or pictures/figures generated by a picture drawing program (not shown).

The "page print data" is print data representing print data to be printed on a page basis. It is noted that the UI module 61 may execute S15 before S14. A process of S15 where the UI module 61 inputs the print data generation instruction to the image generation module 62 is an example of a third instructing process.

When the input of the print data generation instruction is received, the image generation module 62 converts the image data indicated by the print data generation instruction to the page print data in the order indicated by the print data generation instruction to generate the page print data. After the page print data is generated, the image generation module 62 delivers the thus generated page print data to the UI module 61. It is noted that, every time the page print data is generated, the image generation module 61 delivers the generated page print data to the UI module 61 (S28). A process in S16 where image generation module 62 generates the page print data from the image data is an example of a generating process. A process in S28 where the image generation module 62 delivers the page print data to the UI module 61 is an example of a second delivering process. Further, a process in S28 where the UI module 62 receives the page print data from the image generation module 62 is an example of a second obtaining process.

When the print job generation instruction is received, the print communication module 63 generates the print job (S17), and delivers the generated print job to the UI module 61 (S18). The process in S17 where the printer communication module 63 generates the print job is an example of a first generating process. The process in S18 where the printer communication module 63 delivers the print job to the UI module 61 is an example of a second requesting process.

When the print job is delivered, the UI module 61 input the job page generation instruction instructing generation of a first job page to the printer communication module 63 (S19). When the job page generation instruction is received, the printer communication module 63 generates one or multiple job pages corresponding to one or multiple kinds indicated by the argument of the job page generation instruction (S20). It is noted that, in this case, the number of job pages to be generated is the same as the number of pieces of the page print data. That is, one job page is generated for every one piece of page print data.

In the following description, a case where multiple first job pages calling the image generation functions in response to the request for output of the page print data will be described. The process in S19 where the UI module 61 inputs the job page generation instruction to the printer communication module 63 is an example of a second instructing process. The process in S20 where the printer communication module 63 generates the job page is an example of a second generating process.

The printer communication module 63 delivers the generated first job page to the UI module 61 (S21). When the first job page is delivered, the UI module 61 inputs the job start instruction to the printer communication module 63. The job start instruction includes the first job page, which is delivered in S19, as the argument. The printer communication module 63, to which the job start instruction is input, registers the multiple first job pages indicated by the argument of the job start instruction with the print job generated in S17 in the order indicated by the argument (S23).

Next, the printer communication module 63 outputs an initialization command (S24). The output initialization command is input, by the print module, to the printer 11 through the network I/Fs 53 and 22. When the initialization command is input, the printer 11 performs the initialization process. The process in S24 where the printer communication module 63 performs the initialization is an example of a second outputting process.

Next, the printer communication module 63 processes, from among the plurality of first job pages registered (S23) with the print job as generated (S17), an initial one of the first job pages (S25). It is noted that the generated print job requests the registered first job page for output of the page print data (S26). When output of the page print data is requested, the first job page calls the image generation function (S27). The process in S27 where the first job page calls the image generation function will be referred to as a first requesting process.

The UI module 61 stores the page print data delivered in S28 as a file (S29). Next, the UI module 61 delivers a path indicating the page print data stored as a file to the printer communication module 63 as a return value of the image generation function called in S27 (S30). The process in S30 where the UI module 61 delivers the path to the printer communication module 63 is an example of a first delivering process. The path is an example of data indicating the page print data.

The first job page to which the path was delivered develops the file indicated by the path to obtain the page print data (S31), and delivers the obtained page print data to the print job. That is, the print communication module 63 obtains the page print data which is a one page of print data.

The process in S31 where the printer communication module 63 obtains the page print data is an example of a first obtaining process and an obtaining process.

The printer communication module 63, which has obtained the page print data, generates print instruction data including the page print data and the print command, and outputs the generated print instruction data (S32). The output print instruction data is input, by the print module, to the printer 11 through the network I/Fs 53 and 22. The printer 11 to which the print instruction data has been input prints out the page print data included in the print instruction data on the tape in accordance with the print command included in the print instruction data. The process in S32 where the printer communication module 63 outputs the print instruction data is an example of a first outputting process and an outputting process.

Next, the printer communication module 63 calls a deletion function (S33). The printer communication module 63 delivers the delivers an identifier associated with the page print data obtained in S31 to the UI module 61 as an argument of the called deletion function (S34).

The UI module 71, to which the identifier has been delivered, deletes the page print data indicated by the identifier from the file (S35).

The printer communication module 63 processes the plurality of job pages registered with the print job in the order of registration (S36, S37) in a manner similar to the processes (S25-S35) performed on the initial job page. It is noted that, in the processes of S36 and S37, the first page calls the image generation function in accordance with the previously processed first job page being delivered with the path from the UI module 61. That is, the printer communication module 63 (first job page) calls the image generation function in synchronization with the UI module 61.

When the last one of the job pages registered with the print job generated in S17 has been processed (S37), the printer communication module 63 outputs a completion command (S38). The output completion command is input, by the print module, to the printer 11 through the network I/Fs 53 and 22. The printer 11, to which the completion command has been input, actuates the cutter of the print engine 21 to cut the tape. The process in S38 where the printer communication module 63 outputs the completion command is an example of a third outputting process.

Effects of the Illustrative Embodiment

According to the illustrative embodiment, the page print data generated by the image generation module 62 is delivered to the printer communication module 63 every time when it is generated. The printer communication module 63 outputs the print instruction data including the delivered page print data and transmits the same to the printer 11 every time when the page print data is delivered. Therefore, in comparison with a case where print instruction data including all the pieces of the page print data is transmitted to the printer 11 after the image generation module 62 converts all the pieces of image data to the print data, a time period from a point of time when the user instructs the PC 12 to start printing to a point of time when the printer 11 actually starts printing, and a time period from a point of time when the user instructs the PC 12 to start printing to a point of time when printing of the initial page (i.e., the first page) is completed become shorter.

According to the illustrative embodiment, the UI module 61 delivers the path indicating the page print data to the first job page in response to the first job page calling the function.

The first job page calls the function in accordance with a request by the print job. Therefore, it is prevented that the path indicating the page print data is delivered to the printer communication module 63 when the printer communication module 63 is in a state that it cannot process the page print data.

According to the illustrative embodiment, the first job page can obtain the page print data by calling the function.

According to the illustrative embodiment, the printer communication module 63 output the initialization command before the outputting the initial print instruction data including the page print data, and outputs the completion command when outputting the last print instruction data. Therefore, it is prevented that the printer 11 executes the initialization process every execution of printing one page of image.

Specifically, according to a conventional program which does not have the first job page, all the pieces of the page print data may be transmitted collectively to the printer, or the page print data may be transmitted to the printer on a page basis. If all the pieces of page print data are transmitted to the printer, a time period from a time when the user instructs the PC to execute printing to a time when the printer actually starts printing becomes longer. On the other hand, when the page print data is transmitted to the printer on a page basis, the printer executes the initialization process every execution of printing of one page of image. If the initialization process is executed at every execution of one-page printing, the tape is drawn by a particular length and cut out at every execution of one-page printing. Thus, the tape is unnecessarily consumed.

According to the illustrative embodiment, when the last print instruction data is output, the completion command is output. Therefore, according to the illustrative embodiment, it is prevented that the printer 11 executes the initialization process every time the one-page printing is performed. As a result, it is avoided that the tape is unnecessarily consumed.

According to the illustrative embodiment, the first job page is capable of calling the image generating function in synchronization with the UI module 61 to obtain the page print data.

Further, according to the illustrative embodiment, the printer communication module 63 has a polymorphically defined job page class. Therefore, according to the illustrative embodiment, the first page configured to call an image generating function to obtain the page print data and deliver the same to the print job in response to a request for the page print data, and the second page configured to obtain the page print data and deliver the same to the print job in response to request for the page print data can be generated relatively easily.

According to the illustrative embodiment, the page print data delivered to the printer 10 is deleted in sequence before the print job is completed. Therefore, in comparison with a case where the print data is deleted after completion of the print job, a usage capacity of the memory can be lessened.

<Modification>

Hereinafter, a process executed by the program 47 when one or multiple pieces of page print data indicated by the print instruction have been stored in the memory 43 when the print instruction is made will be described as a modified embodiment. Concretely, according to the modification, a case where the first job page and the second job page are generated and registered with the print job will be described.

In the following description, the print instruction instructing to print two pages of image data is input (FIG. 2, S13) and the image data for the second page has already been stored in the memory when the print instruction is input will be explained. It is noted that, in the following description, processes different from those of the illustrative embodiment will be explained.

Figure 2:
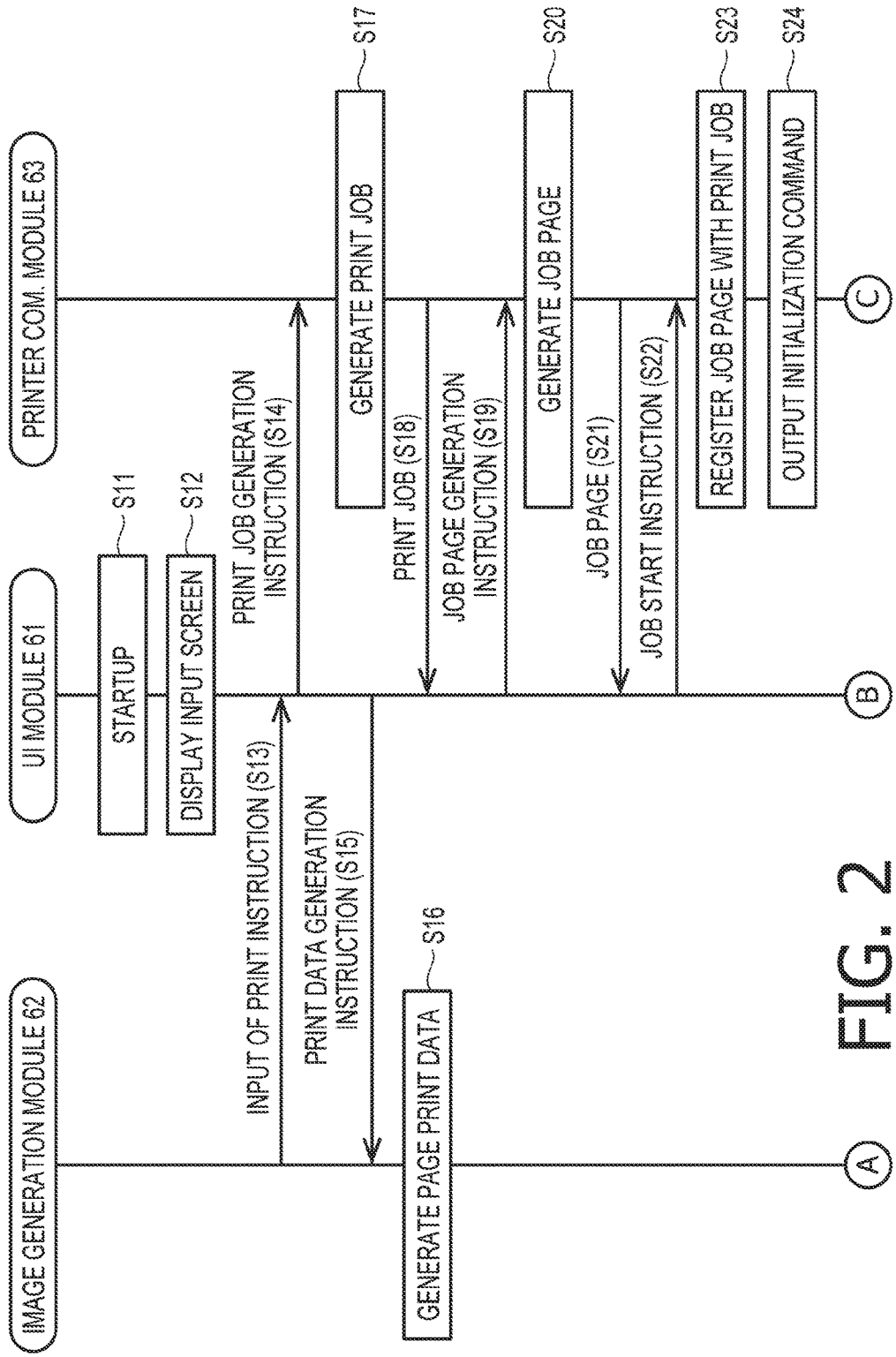
FIGS. 2-4 show flowcharts illustrating processes executed by an image generation module, a UI module and a printer communication module.

The UI module 61 inputs the job page generation instruction indicating generation of the first job page and the second job page with arguments to the printer communication module 63 (FIG. 2, S19). Then, the printer communication module 63 generates the first job page and the second job page in accordance with the job page generation instruction (S20), and delivers the same to the UI module 61 (S21). Further, when the job start instruction is input from the UI module 61 (S22), the printer communication module 63 registers the first job page and the second job page with the print job in this order (S23). Thereafter, the printer communication module 63 processes the first job page, which is the initial job page (S25-S34), as in the illustrative embodiment described above.

Next, the printer communication module 63 processes the second job page (FIG. 5, S41). Concretely, the print job of the printer communication module 63 requests the second job page for output of the page print data. When the output of the page print data is requested, the second job page develops the file indicated by the path, obtains the page print data (S31), and delivers the same to the print job. It is noted that the path is delivered, for example, from the UI module 61 in the job start instruction which is input to the printer communication module 63 in S22 of FIG. 2. Thereafter, the printer communication module 63 executes S32, S33 and S38 (FIG. 4) as in the illustrative embodiment described above.

<Effects of Modification>

In a case where the page print data has already been stored in the memory when the print instruction is input, the path indicating the page print data is delivered to the printer communication module 63, without depending on the image generation function. In one print job, delivering of a path indicating the page print data based on the image generation function and delivering of a path indicating the page print data not based on the image generation function can be performed. Thus, in comparison with a case where all the pieces of the page print data are delivered to the printer communication module 63 based on the image generation function, a time period necessary for generating the print instruction data can be shortened. As a result, a time period from a point of time when the user instructs printing to a point of time when the printing is completed can be shortened.

<Further Modifications>

According to the illustrative embodiment, the path indicating the page print data is delivered from the UI module 61 to the printer communication module 63. The configuration may be modified such that, instead of the path, the page print data itself is delivered from the UI module 61 to the printer communication module 63.

In the illustrative embodiment, the first job page calls the image generation function in synchronization with the UI module 61. It is noted that the first job page may call the image generation function asynchronous with the UI module 61. For example, when previously processed first job page calls the image generation function, the currently executed first job page may be configured to call the image generation function regardless whether previously processed first job page obtained the page print data. That is, the first job pages registered with the print job may call the image generation function in the order of registration.

According to the illustrative embodiment, a label printer is described as the printer 11. The printer 11 may be a low-end label printer or a high-end label printer.

The low-end label printer is typically configured to print relatively simple figures, symbols, characters and letters monochromatically, with a printing resolution is approximately 180 dpi on a tape of which width ranges from 6 mm-36 mm. The low-end label printer is generally used to print a notice and/or a name on a tape which is to be adhered on furniture or stationery. The low-end label printer typically uses Wi-Fi® for communication.

The high-end label printer is typically configured to print figures, symbols, characters and letters monochromatically, with a printing resolution is approximately 300 dpi on a tape of which width ranges from 15 mm-102 mm. The high-end label printer is generally used to print enclosing lines, consumption time limit of food and the like on a display label (tape) to be adhered on a surface of a food container. The high-end label printer is also used to create a large number of display labels at a time by performing a continuous printing. The high-end label printer typically uses Wi-Fi®, a LAN cable, a USB cable and the like for communication.

In the illustrative embodiment, the printer 11 is described as a label printer. It should be noted that the printer 11 may be a printer other than the label printer as described. For example, the printer 11 may be a page printer, a decoration label printer, a metal/wood processing printer, or a development-planned high-end label printer.

The page printer is for performing printing a color or monochromatic image on a particular size (e.g., B5, A4 or A3 size) with a printing resolution of approximately 1200 dpi. The page printer is typically used for printing photographed images, office documents and the like. The page printer typically uses Wi-Fi®, the USB cable or the like for communication.

The decoration label printer is typically configured to print figures, symbols, characters and letters monochromatically, with a printing resolution is approximately 180 dpi on a sheet (label) of which width ranges from 3.5 mm-12 mm Because of its purpose of decoration, various colors of sheets are available. That is, the number of kinds of sheet usable by the decoration label printer is very large in comparison with that for the low-end label printer. Further, the decoration label printer is assumed to generate decoration sheets such as a masking tape, and assumed to print a continuous pattern such as an image of a continuous ribbon. The decoration label printer typically uses Wi-Fi® for communication.

The metal/wood processing printer is configured to form an image on a surface of a printing medium made of metal, wood or glass set to the printer by irradiating a laser beam thereon. The metal/wood processing printer is a device communicatable mainly using the USB cable.

The development-planned high-end label printer is assumed to print figures, symbols and characters on a sheet (i.e., label) of which width ranges from 23 mm-62 mm, to be attached on a surface of a food container with three colors and with the print resolution of approximately 600 dpi. The development-planned label printer is a device communicatable with using Wi-Fi® and Bluetooth®.

What is claimed is:

1. A non-transitory computer-readable recording medium for information processing device provided with a network interface, a user interface and a controller, the recording medium containing instructions configuring a first module and instructions configuring a second module, the first module causes, when executed, the controller to perform:
  a first receiving process of receiving a print instruction through the user interface;
  a first instructing process of instructing the controller executing the second module to generate a print job in response to receipt of the print instruction in the first receiving process;
  a second instructing process of instructing generation of a plurality of job pages to the print job generated by the controller executing the second module in the first instructing process;
  a generating process of generating page print data which is print data for each page based on the image data instructed by the print instruction;
  a first delivering process of delivering data indicating the page print data generated in the generating process to the controller executing the second module for each of the job pages, and the second module causes, when executed, the controller to perform:
  a first generating process of generating the print job in response to the instruction issued in the first instructing process;
  a second generating process of generating a plurality of job pages for the print job in response to the instruction made in the second instruction process;
  a first obtaining process of obtaining the page print data delivered from the first delivering process for each of the job pages generated in the second generating process; and
  a first outputting process of outputting first instruction data including the page print data obtained in the first obtaining process and a printing command causing the printer to perform printing when the page print data is obtained for each of the job pages.

2. The non-transitory computer-readable recording medium according to claim 1,
  wherein the second module causes, when executed, the controller to perform a first requesting process of requesting the controller executing the first module to deliver data indicating the page print data, and
  wherein the first module causes, when executed, the controller to perform the first delivering process of delivering data indicating the page print data generated in the generating process in response to a request for data indicating the page print data in the first requesting process.

3. The non-transitory computer-readable recording medium according to claim 2,
  wherein the first module causes, when executed, the controller to perform the second instructing process designating an image generating function,
  wherein the second module causes, when executed, the controller to perform the first requesting process requesting the controller executing the first module for the page print data sequentially by calling the image generating function designated in the second instructing process, and
  wherein the first module causes, when executed, the controller to perform the first delivering process of delivering data indicating the page print data generated in the generating process to the controller executing the second module as a return value of the image generating function called by the controller executing the second module.

4. The non-transitory computer-readable recording medium according to claim 3,
wherein the second module causes, when executed, the controller to perform:
a second outputting process of outputting second instruction data including an initializing command instructing execution of an initializing process to be executed before execution of printing by the printer, before the first instruction data is output in the first outputting process; and
a third outputting process of outputting a termination command instructing the printer to terminate printing after execution of the first outputting process on all pieces of page print data delivered by the controller executing the first module.

5. The non-transitory computer-readable recording medium according to claim 4,
wherein the second module causes, when executed, the controller to perform:
the first requesting process of calling a next image generation function in response to obtaining data indicating the page print data as a return value of the image generation function.

6. The non-transitory computer-readable recording medium according to claim 4,
wherein the second module causes the controller to perform:
the first requesting process of calling a next image generation function without obtaining data indicating the page print data in response to calling of the image generation function.

7. The non-transitory computer-readable recording medium according to claim 3,
wherein the first module includes:
a third module which causes, when executed, the controller to perform a displaying process of displaying images on a display provided to the image processing device, the receiving process, the first instructing process, the second instructing process and the first delivering process; and
a fourth module which causes, when executed, the controller to perform the generating process;
wherein the third module causes, when executed, the controller to perform:
a third instructing process of instructing the controller executing the fourth module to generate the page print data; and
a second obtaining process of obtaining the page print data generated by the controller executing the fourth module,
wherein the fourth module causes, when executed, the controller to perform:
the generating process of generating the page print data in response to instruction to generate the page print data in the third instruction process; and
a second delivering process of sequentially delivering the page print data generated in the generating process to the controller executing the third module.

8. The non-transitory computer-readable recording medium according to claim 3,
wherein the second module causes, when executed, the controller to perform a second requesting process of requesting the controller executing the first module for a generation instruction of the plurality of job pages including at least one of the first job page and the second job page in response to generation of the print job in the first generating process, the first job page being a page which calls the image generation function in response to the request for the page print data, the second page being a page delivering the page print data in response to the request for the page print data,
wherein the first module causes, when executed and in response to the request in the second requesting process, the controller to perform:
the second instructing process of instructing the controller executing the second module to generate the job page including the first job page when the image data is designated in the print instruction; and
the second instruction process of instructing the controller executing the second module to generate the job page including the second job page when the page print data stored in the memory of the information processing device is designated in the print instruction.

9. The non-transitory computer-readable recording medium according to claim 8,
wherein the first module causes, when executed, the controller to perform one of:
the first delivering process of delivering the page print data generated in the generating process to the controller executing the second module; and
the first delivering process of delivering a path indicating the page print data generated in the generating process to the controller executing the second module.

10. The non-transitory computer-readable recording medium according to claim 1,
wherein the second module includes:
a job class to generate the print job; and
a job page class which is a polymorphically defined class and generates a first job page and a second job page, the first job page calling image generation function when the page print data is requested, the second job page outputting the page print data when the page print data is requested, the image generation function being a function in which the page print data being set as a return value when called,
wherein the second module causes, when executed, the controller to:
generate the plurality of job pages including at least one of the first job page and the second job page in accordance with a designation by the controller executing the first module and register the plurality of job pages with the print job;
wherein the print job causes the controller to:
request the registered plurality of job pages for the page print data; and
output the first instruction data including the page print data obtained in response to the request and the printing command every time when the page print data is obtained.

11. A non-transitory computer-readable recording medium for an information processing device provided with a network interface, a user interface and a controller, the recording medium containing instructions configuring a communication module,
wherein the communication module causes, when executed, the controller to perform:
a first generating process of generating a print job in accordance with an instruction received from the controller executing a UI module;
a second generating process of generating a plurality of job pages in accordance with the instruction received from the controller executing the UI module;

an obtaining process of obtaining the page print data indicated by data which is delivered from the controller executing the UI module for each of the job pages generated in the second generating process; and an outputting process of outputting instruction data including the page print data obtained in the obtaining process and a printing command causing the printer to perform printing every time when the page print data is obtained for each of the job pages.

* * * * *

UNITED STATES PATENT AND TRADEMARK OFFICE
CERTIFICATE OF CORRECTION

PATENT NO. : 10,908,852 B2
APPLICATION NO. : 16/249277
DATED : February 2, 2021
INVENTOR(S) : Yu Matsuo It is certified that error appears in the above-identified patent and that said Letters Patent is hereby corrected as shown below:

In the Claims

Column 14, Claim 1, Line 1 should read:
wherein the first module causes, when executed, the controller to Column 14, Claim 1, Line 21 should read:
wherein the second module causes, when executed, the controller Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*